United States Patent [19]

Tachiki

[11] 4,316,669
[45] Feb. 23, 1982

[54] EXPOSURE APPARATUS
[75] Inventor: Tatsuo Tachiki, Toyonaka, Japan
[73] Assignee: Kabushiki Kaisha Kaneda Kikai Seisakusho, Osaka, Japan
[21] Appl. No.: 138,780
[22] Filed: Apr. 10, 1980
[30] Foreign Application Priority Data Apr. 17, 1979 [JP] Japan .............................. 54-51787[U]
Apr. 17, 1979 [JP] Japan .............................. 54-51788[U]

[51] Int. Cl.³ ........................................... G03B 27/20
[52] U.S. Cl. ..................................................... 355/91
[58] Field of Search ....................... 355/91, 92, 93, 94, 355/76

[56] References Cited

U.S. PATENT DOCUMENTS 1,478,828 12/1923 Jones ....................................... 355/91
1,996,966 4/1935 Koppe ..................................... 355/91
3,635,559 1/1972 Harrell et al. ........................... 355/91

Primary Examiner—Monroe H. Hayes
Attorney, Agent, or Firm—Jordan and Hamburg

[57] ABSTRACT

A baseboard for retaining a photosensitive plate thereon is fixedly disposed immediately below an exposure light source and in a path provided by means for feeding the plate to the baseboard and means in alignment with the feeding means for delivering the plate from the baseboard after exposure. A frame for superposing a negative film and a stiff transparent sheet on the photosensitive plate fed to the fixed baseboard is provided with squeegee rolls which are rollable on the transparent sheet to press out and remove air from between the film and the plate. With frame moved upward and downward relative to the fixed baseboard, the apparatus performs the successive steps of feeding the plate, removing the air, exposing the plate and discharging the exposed plate.

5 Claims, 9 Drawing Figures

EXPOSURE APPARATUS

BACKGROUND OF THE INVENTION

The present invention relates to an exposure apparatus for printing the image of a negative film on a photosensitive plate with the film superposed on the plate by exposing the plate to the image with a light source disposed above the film.

Exposure apparatus of this type heretofore known are divided into two general types:

(1) Those in which a fixed baseboard having a plate receiving surface in a horizontal or substantially horizontal position for holding a photosensitive plate in intimate contact therewith is in alignment with a path of transport of the plate for feeding the plate to the baseboard and delivering the plate from the baseboard after exposure. The baseboard is movable transversely of the direction of transport of the plate to a position in the path or alternatively to a position below the main body of the apparatus having an exposure light source disposed above the path on one side thereof.

(2) Those in which the above-mentioned fixed baseboard and the main body of the exposure apparatus are always fixedly provided in the path of transport of photosensitive plates in alignment therewith, and a negative film retained in position in the form of a roll is paid off and superposed on a photosensitive plate fed to the baseboard.

The exposure apparatus of these two types have the following advantages and drawbacks.

With the apparatus of the type (1), the negative film need not be rolled up but is usable in its original planar state and is therefore very easy to set or reset on the baseboard. The negative film, which is not curly, can be superposed on the photosensitive plate in highly intimate contact therewith and enables a squeegee roll to effectively remove air from between the film and the plate. Despite these advantages, the apparatus have the drawback of necessitating an increased floor space for installation in its entirety because the main body including the light source is located on one side of the path of transport as projected therefrom.

Although the apparatus of the type (2) have the advantage of assuring a reduction in the floor space needed with the baseboard and the main body disposed fixedly in the path of transport at all times, the negative film, which is curly, fails to fit to the photosensitive plate intimately and is very likely to warp, permitting some air to remain again between the film and the plate even after air has been pressed out and removed from therebetween and consequently giving a print with an uneven density or a blurred image.

SUMMARY OF THE INVENTION

The main object of this invention is to provide an exposure apparatus which is capable of performing a continuous exposure operation efficiently with a sequence of steps involving no idle movement and which nevertheless has the advantages of the two types of exposure apparatus described above.

To fulfill the above object, the exposure apparatus of the invention comprises a fixed baseboard having a plate receiving surface in a horizontal or substantially horizontal position for holding a photosensitive plate in intimate contact therewith by the suction of a vacuum pump, means for feeding the photosensitive plate to the fixed baseboard from one end thereof, means disposed in alignment with the feeding means for delivering the plate from the fixed baseboard toward the other end thereof after exposure, a frame for withdrawably setting a negative film and a flexible but stiff, transparent sheet in place with the sheet superposed on the film, and an exposure light source provided with a reflecting mirror and disposed immediately above the fixed baseboard. The apparatus is characterized in that the setting frame is movable upward and downward relative to the fixed baseboard and is provided with at least one squeegee roll rollingly movable on the upper surface of the transparent sheet to thereby press out air from between the negative film and the photosensitive plate after the frame has been moved downward to superpose the film on the plate held in intimate contact with the receiving surface of the baseboard, and that means are provided on opposite sides of the fixed baseboard for moving the setting frame upward and downward while holding the frame positioned in parallel to the baseboard. The photosensitive plate is feedable to the fixed baseboard by the feeding means and dischargeable from the baseboard by the delivering means after exposure when the setting frame is moved upward by the moving means, and the squeegee roll is rollingly movable to press out the air and make the photosensitive plate ready for specified exposure when the setting frame is moved downward by the moving means.

Because the apparatus has the foregoing construction, the setting frame having the squeegee roll, when moved upward away from the fixed baseboard by the moving means, renders the photosensitive plate feedable to the base board. The setting frame, when moved downward after the feed of the plate, superposes the negative film on the plate, permitting the squeegee roll to subsequently roll on the transparent sheet so that the plate can be thereafter exposed. The setting frame is raised again after the exposure, thereby making the exposed plate dischargeable from the baseboard and the squeegee roll returnable to its original position. Thus merely through a sequence of upward and downward movements of the setting frame involving no loss, the apparatus performs the substantially entire process needed for making an exposure. A continuous exposure operation can therefore be carried out very efficiently with a reduced loss time. Moreover since the main body of the exposure apparatus including the baseboard and light source is fixedly located in the path of transport of photosensitive plates at all times, the floor space needed for the installation of the entire apparatus is smaller than is required for the conventional apparatus of the type (1). With the setting frame further adapted to retain the negative film in a planar position free of any warp with the stiff transparent sheet superposed thereon, the film is settable in place in highly intimate contact with the photosensitive plate, thereby assuring effective removal of air by the squeegee roll. This enables the apparatus to produce prints as desired, with little or no unevenness of the image density or indistinctness of the image.

Other objects and advantages of the invention will become apparent from the following description.

DESCRIPTION OF THE PREFERRED EMBODIMENT

An embodiment of the invention will be described below with reference to the drawings.

Figure 1:
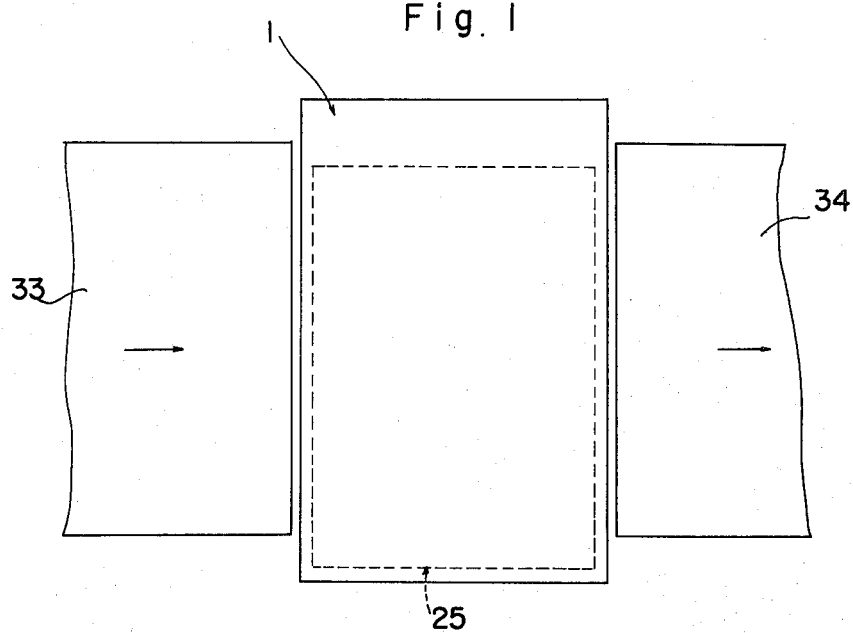
FIG. 1 is a schematic plan view of an exposure apparatus embodying the invention to show the overall arrangement thereof.
Figure 2:
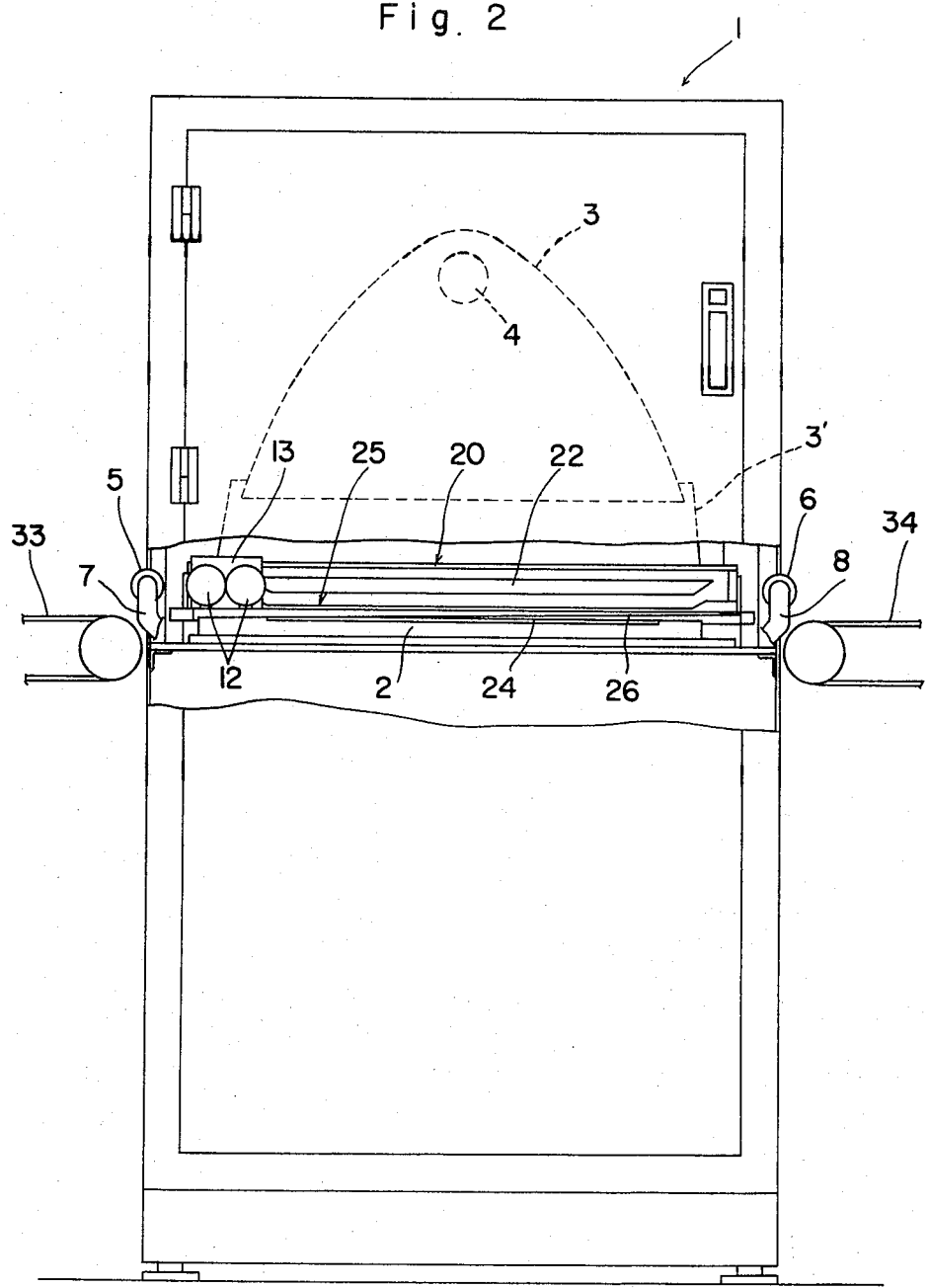
FIG. 2 is a schematic side elevation partly broken away to show the same.

As shown in FIGS. 1 and 2, the main body 1 of an exposure apparatus is fixedly disposed between the terminal end of a belt 33 for feeding photosensitive plates 24 and the starting end of a belt 34 for delivering the plates after exposure, in a path of transport of the plate provided by the belts 33, 34 which are in alignment with each other. The main body 1 comprises a fixed baseboard 2 having a receiving surface 2a in a horizontal or substantially horizontal position for receiving and supporting the photosensitive plate 24 at substantially the same level as the upper surfaces of the belts 33, 34, and an exposure light source 4 disposed immediately above the baseboard 2 and provided with a reflecting mirror 3.

Figure 3:
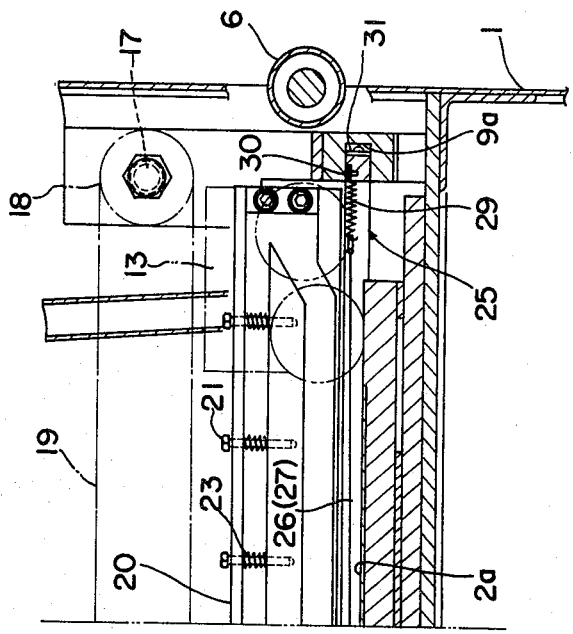
FIG. 3 is a fragmentary enlarged view in vertical section showing the same.
Figure 3:
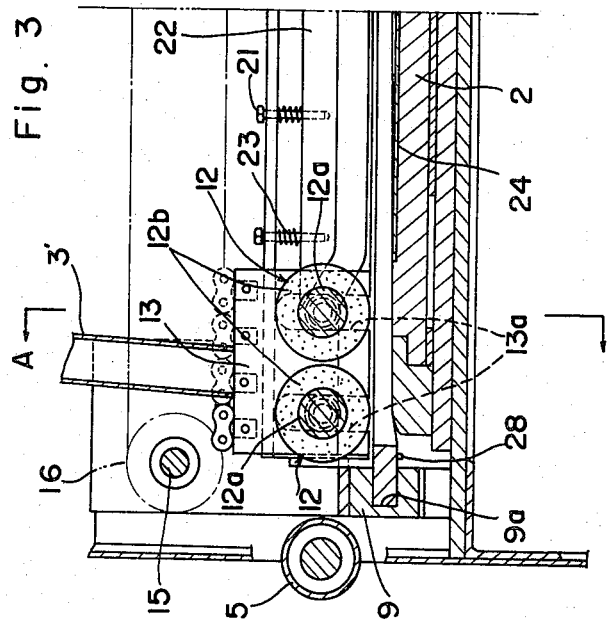
Figure 4:
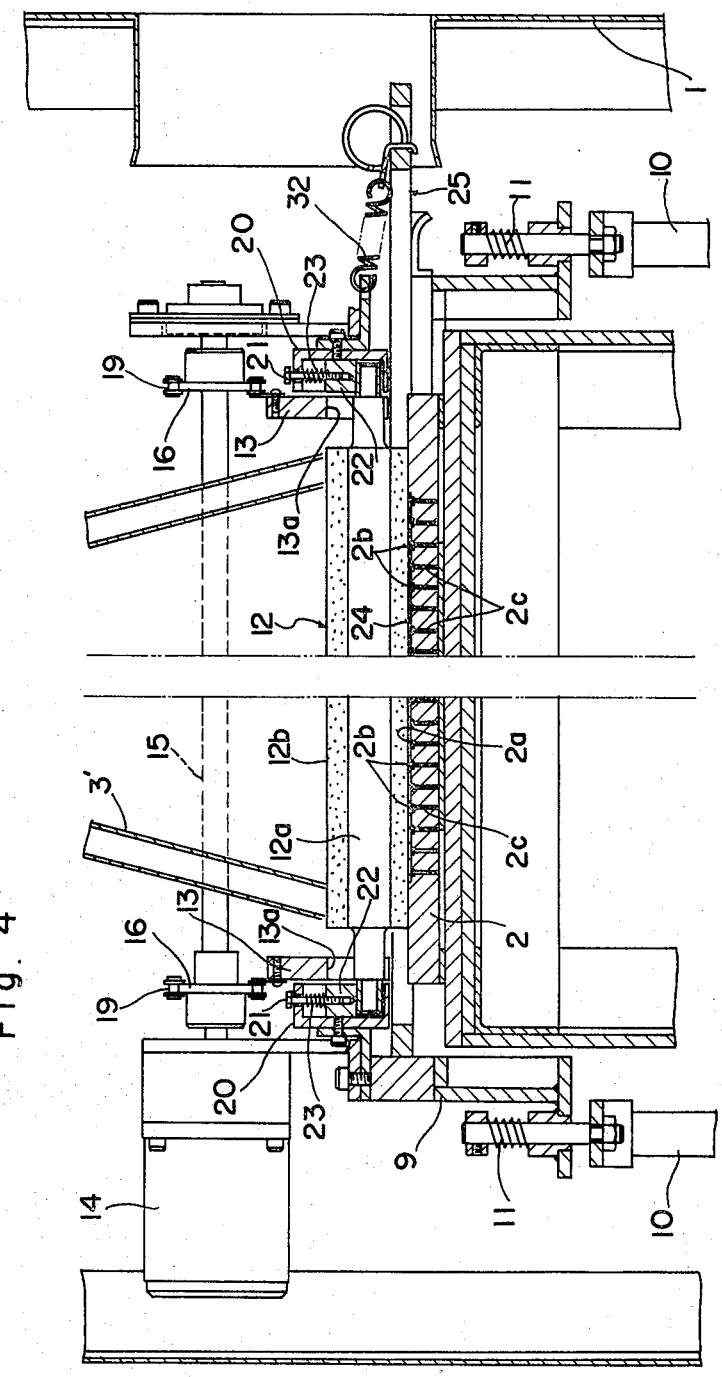
FIG. 4 is a view in section taken along the line A—A in FIG. 3.

The interior construction of the main body 1 will now be described below in greater detail with reference to FIGS. 3 and 4. Pinch rollers 5 and 6 are rotatably supported by the free ends of pivotal arms 7 and 8 provided at the inlet and outlet of the main body 1. The pinch roller 5 at the inlet transfers the plate 24 from the terminal end of the feeding belt 33 onto the receiving surface 2a of the fixed baseboard 2. The pinch roller 6 at the outlet transfers the plate 24 from the surface 2a onto the delivering belt 34 after exposure. The baseboard 2 is formed in its upper surface with a large number of grooves 2b communicating with an unillustrated vacuum pump through small channels 2c extending through the baseboard 2. The plate 24 is held in intimate contact with the receiving surface 2a by the suction of the pump. The grooves 2b are elongated in the direction of transport of the plate 24 so as not to interfere with the feed and discharge of the plate 24. A negative film cassette frame 25 to be positioned above the plate 24 on the surface 2a, namely, in the exposure position is horizontally insertable into and withdrawable from opposed grooves 9a, 9a formed in a setting frame 9 which is movable upward and downward relative to the baseboard 2. The setting frame 9 is coupled to the piston rods 10, 10 of cylinders on opposite sides of the baseboard 2. Compression springs 11, 11 are provided between the setting frame 9 and the piston rods 10, 10 for biasing the setting frame 9. A flexible but stiff, transparent Lumirror sheet 26 provided on the cassette frame 2 has a negative film 27 laminated to its lower surface. Squeegee rolls 12, 12 rollingly run on the upper surface of the sheet 26 to thereby press out and remove air from between the film 27 and the plate 24. Two rolls 12 are arranged side by side in the direction of the rolling movement thereof. Each of the squeegee rolls 12, 12 comprises a rigid shaft 12a and a neoprene rubber or like elastic tube 12b fitting around the shaft 12a. The shafts 12a, 12a are inserted at positions close to both ends thereof in downwardly open grooves 13a, 13a of comb-shaped running members 13, 13 made of synthetic resin. The shafts are upwardly and downwardly movable and rotatable relative to the running members. A reversible motor 14 mounted on the setting frame 9 has an elongated drive shaft 15 fixedly carrying sprockets 16, 16 at portions thereof close to both ends. Sprockets 18, 18 are fixedly mounted on driven shafts 17, 17 supported in a cantilever fashion by the main body 1 in parallel to the drive shaft 15. Chains 19, 19 are reeved around the sprockets 16, 16 and the sprockets 18, 18 respectively. The comb-shaped running members 13, 13 are connected to the chains 19, 19. Channel members 20, 20, U-shaped in cross section, are attached to opposite sides of the setting frame 9. Vertically slidably extending through the upper side of each channel member 20 are bolts 21, 21, . . . supporting a guide rail 22 in suspension. Compression springs 23, 23, . . . fitting around the bolts 21, 21, . . . bias the guide rail 22 downward. The guide rails 22, 22 press the shafts 12a, 12a of the squeegee rolls 12, 12 downward at both shaft ends during the running of the rolls, thereby causing the elastic tubes 12b, 12b to press the negative film 27 against the plate 24.

Figure 5:
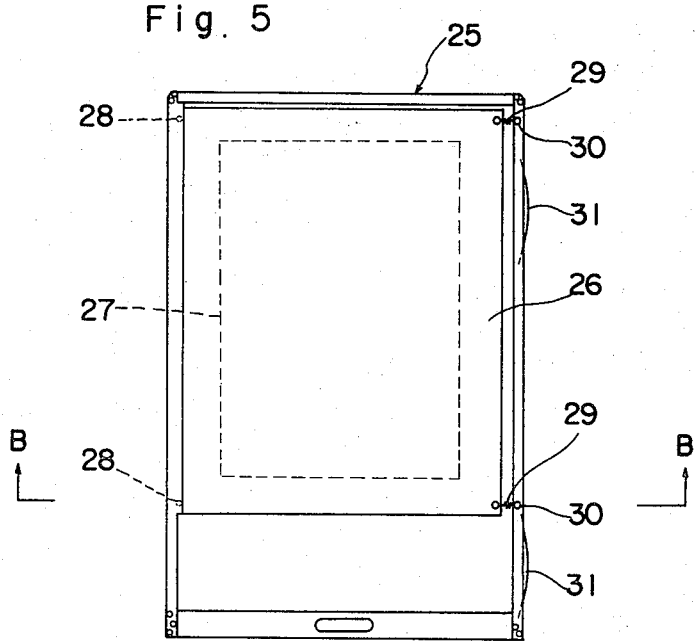
FIG. 5 is a plan view showing a negative film cassette.
Figure 6:
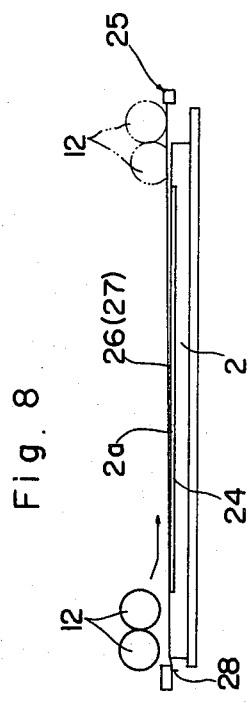
FIG. 6 is an enlarged view in section taken along the line B—B in FIG. 5.

As seen in FIG. 5, the cassette frame 25 is rectangular. The Lumirror sheet 26 which has a very small thickness (0.1 to 0.15 mm) and which is stiff and transparent like celluloid is stretched over the frame 25 and has the negative film 27 affixed to its lower surface. As will be apparent from FIG. 6, the sheet 26 is engaged, at the rear side thereof with respect to the direction of advance of the squeegee rolls 12, 12, by pins 28, 28 on the lower side of the frame 25 and is also engaged, at the forward side thereof, by tension springs 29, 29 attached to pins 30, 30 on the upper side of the frame 25. Accordingly the sheet 26 is held tensioned by the forces of the springs 29, 29 to a planar state in its entirety to keep the underlying film 27 planar. The sheet 26 is in an inclined position in contact with the baseboard 2 at its rear side and extending progressively upwardly away from the receiving surface 2a of the baseboard toward its forward side. This always provides a space through which air escapes when pressed out from between the film 27 and the plate 24 by the squeegee rolls 12, 12 in rolling travel, thus assuring effective removal of the air. Plate springs 31, 31 shown in FIG. 5 and attached to outer portions of the frame 25 on its forward side bear against the setting frame 9, biasing the frame 25 rearward to retain the frame 25 in position. Indicated at 32 in FIG. 4 is a spring detachably connected between the cassette frame 25 for biasing the frame 25 into the setting frame 9 to the proper position. Indicated at 3' is an auxiliary mirror.

Figure 7:
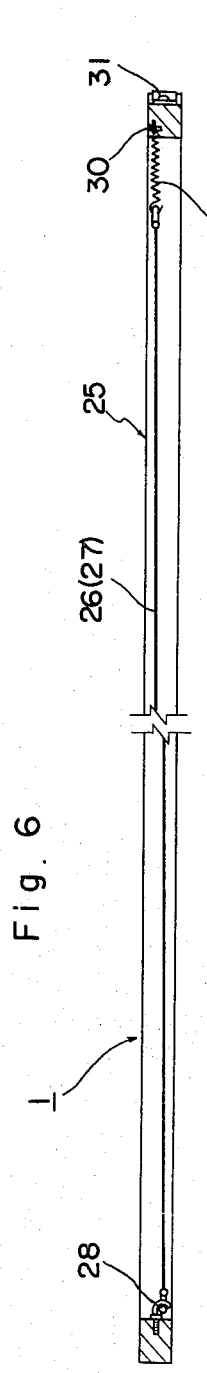
FIGS. 7 to 9 are diagrams illustrating the operation of the apparatus.
Figure 8:
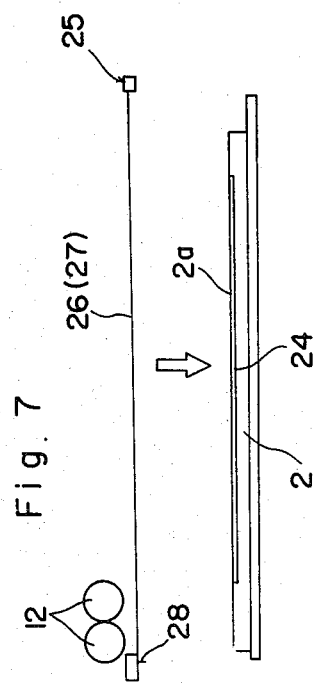
Figure 9:
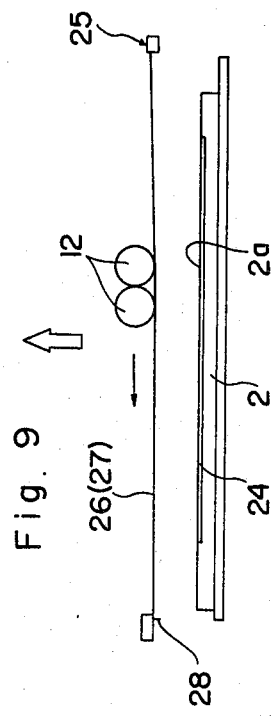

The operation of the exposure apparatus having the foregoing construction will now be described with reference to FIGS. 7 to 9.

The setting frame 9 having the cassette frame 25 and the squeegee rolls 12, 12 held thereto are raised from the fixed baseboard 2 by the rise of the piston rods 10, 10. In this position, a photosensitive plate 24 is fed to the receiving surface of the baseboard 2 by the action of the pinch roller 5 at the inlet (see FIG. 7).

Subsequently the rods 10, 10 are lowered to move the setting frame 9 downward, bringing the cassette frame 25 to the exposure position with the rear side of its sheet 26 in contact with the baseboard 2. The motor 14, when driven in this state, rollingly moves the squeegee rolls 12, 12 along the upper surface of the sheet 26. The guide rails 22, 22, which bias the rolls 12, 12 downward at this time, cause the rolls to press the sheet 26 and the underlying film 27 against the plate 24, whereby the air between the film 27 and the plate 24 is continuously pressed out (see FIG. 8).

When the rolls 12, 12 have reached the forward end of their travel, bringing the film 27 entirely into intimate contact with the baseboard 24, a switch is actuated to turn on the light source 4 and make an exposure for a predetermined period of time, whereupon the setting frame 9 is raised again. At the same time, the squeezee rolls 12, 12 are returned to their original position (see FIG. 9).

After the setting frame 9 has been completely raised, the pinch roller 6 at the outlet functions to transfer the exposed plate 24 onto the delivering belt 34 to complete a sequence of exposure steps.

I claim:

1. An exposure apparatus comprising a fixed baseboard (2) having a plate receiving surface (2a) in a horizontal or substantially horizontal position for holding a photosensitive plate (24) in intimate contact therewith by the suction of a vacuum pump, means (33, 5) for feeding the photosensitive plate (24) to the fixed baseboard (2) from one end thereof, means (6, 34) disposed in alignment with the feeding means (33, 5) for delivering the plate (24) from the fixed baseboard (2) toward the other end thereof after exposure, a frame (9) for withdrawably setting a negative film (27) and a flexible but stiff, transparent sheet (26) in place with the sheet superposed on the film, and an exposure light source (4) provided with a reflecting mirror (3) and disposed immediately above the fixed baseboard (2), means mounting said setting frame (9) for upward and downward movement relative to said fixed baseboard, at least one squeegee roll mounted on said setting frame for rolling movement on the upper surface of said transparent sheet to press out air from between the negative film (27) and the photosensitive plate (24) after the setting frame (9) has moved downward to superpose the film (27) on the plate (24) held in intimate contact with the receiving surface (2a) of the baseboard (2), and means (10, 11) are provided on opposite sides of the fixed baseboard (2) for moving the setting frame (9) upward and downward while holding the frame (9) positioned in parallel to the baseboard (2), the photosensitive plate (24) being feedable to the fixed baseboard (2) by the feeding means (33, 5) and dischargeable from the baseboard (2) by the delivering means (6, 34) after exposure when the setting frame (9) is moved upward by the moving means (10, 11), the squeegee roll (12) being rollingly movable to press out the air and make the photosensitive plate (24) ready for specified exposure when the setting frame (9) is moved downward by the moving means (10, 11).

2. An exposure apparatus as defined in claim 1 characterized in that a plurality of squeegee rolls (12) are arranged side by side in the direction of rolling movement thereof.

3. An exposure apparatus as defined in claim 1 characterized in that guide rails (22) are elastically movably biased downward for guiding the rolling movement of the squeegee roll (12).

4. An exposure apparatus as defined in claim 1 characterized in that the negative film (27) is attachable to and separable from the lower surface of the transparent sheet (26), and that the transparent sheet (26) is held in a planar position in its entirety and attached to a rectangular cassette frame (25) insertable into and withdrawable from opposed grooves (9a), (9a) formed in the setting frame (9), by being engaged at one of opposed sides thereof with pins (28) and being engaged at the other side with other pins (30) with tension springs (29) provided therebetween.

5. An exposure apparatus as defined in claim 4 characterized in that the cassette frame (25) is provided, on one side thereof along the directions in which the cassette frame (25) is insertable into and withdrawable from the setting frame (9), with plate springs (31) for elastically pressing against withdrawal the other side of the cassette frame (25) along the insertable and withdrawable directions, into one of the grooves (9a) opposed to said other side, when the cassette frame (25) has been inserted into the setting frame (9) by a specified amount, and that a spring (32) is connected between the cassette frame (25) and the setting frame (9) changeably between an operative state and a non-operative state for elastically movably biasing the cassette frame (25) toward the insertable direction when the cassette frame (25) has been inserted into the setting frame (9) by the specified amount.

* * * * *